Feb. 24, 1931.　　　C. D. BAISCH　　　1,793,834
ELECTRIC MOTOR
Filed July 16, 1929　　2 Sheets-Sheet 1

Inventor
Clarence D. Baisch
By Clarence A. O'Brien
Attorney

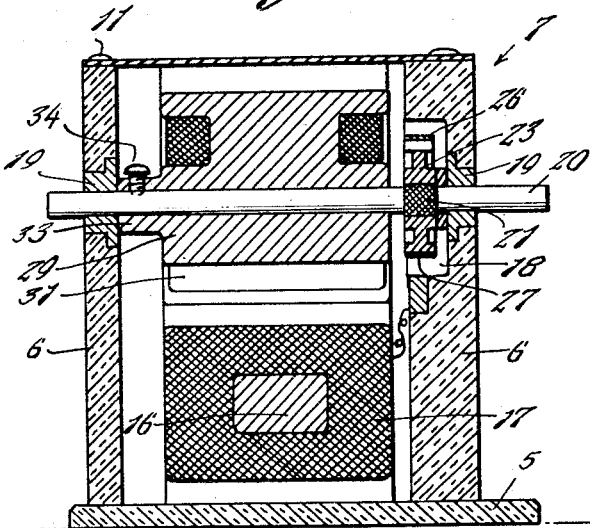
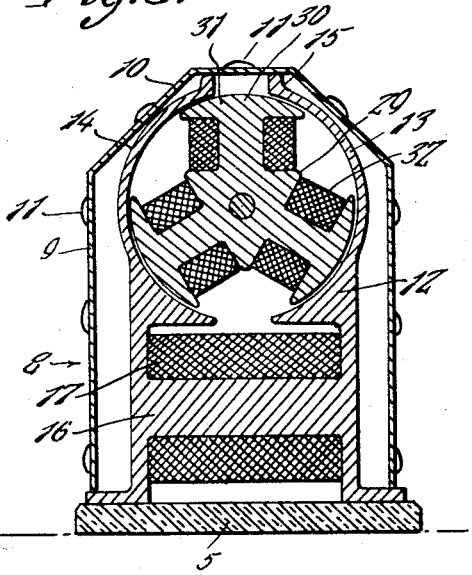
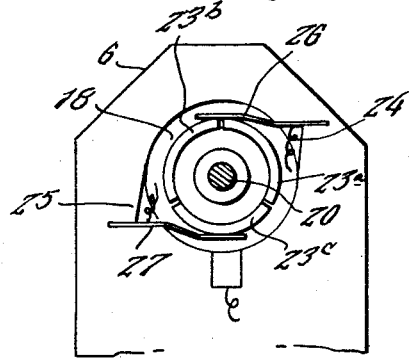

Patented Feb. 24, 1931

1,793,834

UNITED STATES PATENT OFFICE

CLARENCE D. BAISCH, OF ST. LOUIS, MISSOURI

ELECTRIC MOTOR

Application filed July 16, 1929. Serial No. 378,709.

The present invention appertains to new and useful improvements in electric motors and more particularly to a motor which because of simplified construction will utilize less energy than motors of conventional types having the same power output.

An important object of the invention is to provide a motor which because of its unusually simplified construction, can be manufactured at a cost considerably under the cost of the present types of motor now on the market.

These and numerous other important objects and advantages of the invention will become more apparent to the reader after considering the invention as described and claimed hereinafter.

In the drawings:—

Fig. 2 represents a vertical longitudinal sectional view through the motor.

Fig. 3 represents a vertical transverse sectional view through the motor.

Fig. 4 represents an inside elevation of one end wall of the motor housing, showing the manner of mounting the commutator therein.

Figure 1:
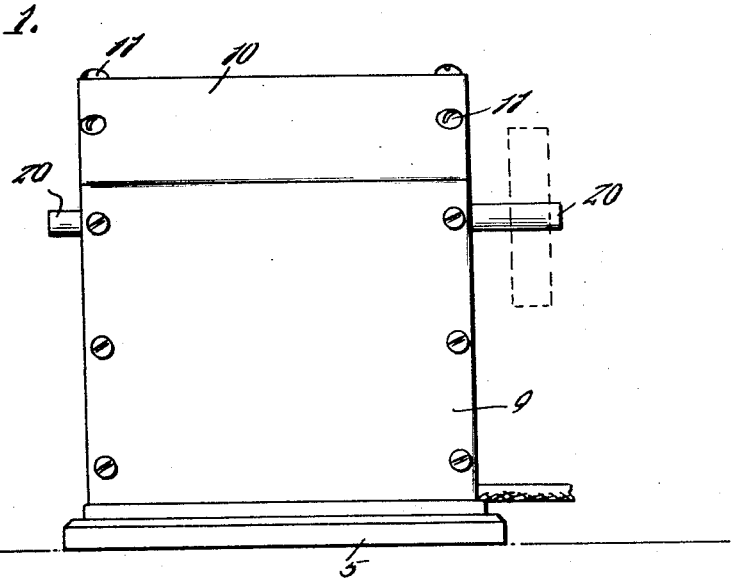
Figure 1 represents a side elevation of the improved motor.
Figure 5:
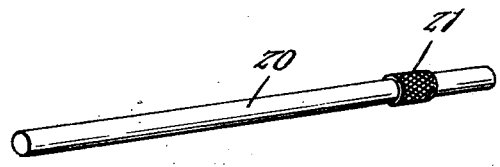
Fig. 5 represents a perspective view of the armature shaft.
Figure 6:
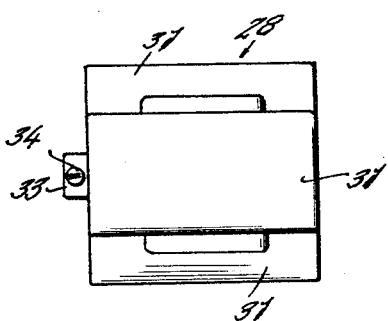
Fig. 6 represents a top plan view of the armature.
Figure 7:
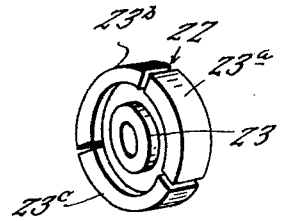
Fig. 7 represents a perspective view of the commutator.

Referring to the drawings wherein like numerals designate like parts, it will be seen that the novel electric motor includes a base plate 5 of suitable dielectric material. Supported upon the base 5 are the end walls 6—6 of the motor housing referred to generally by the numeral 7. An elongated segmental plate 8 is bent to provide side walls 9 and a top portion 10.

Suitable members 11 are employed for securing the sheet metal plate 8 to the end walls 6—6. The field is constructed of cast magnetic steel (preferably), and is denoted by the numeral 12. The field has the semicircular pole pieces 13 and 14 and each pole piece at its upper edge is turned upwardly as at 15. The connecting portion 16 forms a core for the field coil 17, and here it may be noted that the field includes but a single coil.

One of the end walls 6 is comparatively thicker than the other end wall and is provided with a circular recess 18 on the inner sides thereof. The last-mentioned end wall has an opening formed therethrough coaxial with respect to the recess 18 and a corresponding opening in the other end wall. A wear resisting bushing or bearing structure 19 is disposed within each of the openings for receiving the end portions of the armature shaft 20. The armature shaft is provided with a knurled enlargement 21 at a point inwardly from one end thereof, and this knurled enlargement is adapted to be circumscribed by the novel commutator structure, generally referred to by the numeral 22.

The commutator is provided with a hub 23 which may be compressed against the knurled enlargement 21, and extending radially from the hub 23 are the segments 23a, 23b and 23c. The end wall 6 having the recess 18 therein, is also provided with notches 24 and 25, wherein connections may be made to the anchored ends of the spring brushes 26 and 27. These brushes are adapted for wiping contact with the commutator 22, in the manner substantially shown in Fig. 4.

The armature structure is generally referred to by the numeral 28 and is constructed of magnetic field in one piece. Conventional motors are made up of numerous field plates the elimination of which is compensated by the construction of the present device. The armature is provided with a hub 29 from which radiates the pole pieces 30, the same being provided with the curved edge 31.

These pole pieces are three in number and each has a coil 32 wound thereon. A tubular projection 33 on the hub 29 also receives the armature shaft 20 and is provided with a set screw 34 whereby the armature is firmly secured to the said shaft.

While the foregoing description is in detail, it is to be understood that numerous changes in the specific shape, size, and materials may be resorted to without departing from the spirit and scope of the invention as claimed hereinafter.

Having thus described my invention, what I claim as new is:—

An electric motor comprising a base plate of dielectric material, a motor housing supported by said base plate and loosely resting thereupon, said housing consisting of end walls of dielectric material and a sheet metal cover plate bridging the end walls and bent to provide the top and side walls of the housing, screws fastening the cover plate to the said end walls, an armature shaft journalled at its ends in the said end walls, an armature loosely mounted on said shaft and having a set screw for locking the armature and shaft in rigidly connected relation, a sealed magnet within the housing having curved pole pieces between which the said armature revolves, a pocket formed in one of said end walls and concentrically with respect to the said armature shaft, commutator brushes secured in said pocket, and a commutator disk fixed on said shaft and disposed in said pocket in engagement with said brushes.

In testimony whereof I affix my signature.

CLARENCE DAIRD BAISCH.